US010445948B2

(12) United States Patent
Clemente et al.

(10) Patent No.: US 10,445,948 B2
(45) Date of Patent: Oct. 15, 2019

(54) METHOD AND SYSTEM FOR ACCESS CONTROL WITH MODULATED LIGHTS

(71) Applicant: SKIDATA AG, Grödig/Salzburg (AT)

(72) Inventors: Jorge Clemente, Puch bei Hallein (AT); Thomas Schlechter, Seekirchen am Wallersee (AT)

(73) Assignee: SKIDATA AG, Grödig/Salzburg (AT)

( * ) Notice: Subject to any disclaimer, the term of this patent is extended or adjusted under 35 U.S.C. 154(b) by 450 days.

(21) Appl. No.: 15/345,551

(22) Filed: Nov. 8, 2016

(65) Prior Publication Data

US 2017/0372530 A1 Dec. 28, 2017

(30) Foreign Application Priority Data

Jun. 24, 2016 (EP) .................................... 16176204

(51) Int. Cl.

*G06K 5/00* (2006.01)
*G07B 15/02* (2011.01)
*G06Q 50/30* (2012.01)
*G07C 9/00* (2006.01)
*G08C 23/04* (2006.01)
*G07B 15/04* (2006.01)

(52) U.S. Cl.

CPC ............ *G07B 15/02* (2013.01); *G06Q 50/30* (2013.01); *G07B 15/04* (2013.01); *G07C 9/00007* (2013.01); *G07C 9/00103* (2013.01); *G07C 9/00309* (2013.01); *G08C 23/04* (2013.01); *G07C 2009/00507* (2013.01); *G07C 2009/00785* (2013.01)

(58) Field of Classification Search

CPC ........ G06Q 50/30; G07B 15/02; G07B 15/04; G07C 2009/00507; G07C 2009/00785; G07C 9/00007; G07C 9/00103; G07C 9/00309; G08C 23/04

USPC .......................................................... 235/382

See application file for complete search history.

(56) References Cited

U.S. PATENT DOCUMENTS

| | | | | |
|---|---|---|---|---|
| 4,325,146 | A | 4/1982 | Lennington | |
| 2006/0071789 | A1 | 4/2006 | Giannopoulos | |
| 2006/0220785 | A1 | 10/2006 | Ferdman | |
| 2008/0200156 | A1 * | 8/2008 | Hicks .................. | H04M 3/5116 455/415 |

(Continued)

OTHER PUBLICATIONS

European Search Report issued in corresponding European Patent Application No. 16176204.2 dated Dec. 1, 2016. 10 Pages.

*Primary Examiner* — Thien M Le

(74) *Attorney, Agent, or Firm* — Davis & Bujold PLLC; Michael J. Bujold

(57) ABSTRACT

A method for access control in an access control system for people or vehicles comprising at least one access control device. In the method the at least one access control device, using a selective modulation of the frequency, spatial modulation and/or optional temporal modulation of light emitted by a specified number of light sources, transmits information that can be received and demodulated by a mobile electronic device having a camera. The information sent by the access control device contains a unique ID of the access control device, which is used to control the access control device in accordance with data transmitted to the access control system by a mobile electronic device which receives the information transmitted.

8 Claims, 2 Drawing Sheets

(56) References Cited

U.S. PATENT DOCUMENTS

| | | | | |
|---|---|---|---|---|
| 2008/0247345 | A1* | 10/2008 | Bahar | H04W 76/10 370/310 |
| 2013/0126713 | A1* | 5/2013 | Haas | H04B 10/116 250/208.2 |
| 2014/0143034 | A1* | 5/2014 | Pi | H04B 10/116 705/14.4 |
| 2014/0255036 | A1 | 9/2014 | Jovice et al. | |
| 2015/0076989 | A1* | 3/2015 | Walma | H04B 10/40 315/149 |
| 2015/0146001 | A1 | 5/2015 | White | |
| 2015/0294286 | A1 | 10/2015 | Grote | |
| 2016/0042333 | A1 | 2/2016 | Ho et al. | |
| 2016/0061396 | A1* | 3/2016 | Bosua | G08C 23/04 362/231 |
| 2016/0255697 | A1* | 9/2016 | Bhide | H02J 9/06 315/161 |
| 2017/0332450 | A1* | 11/2017 | Blum | H05B 33/0851 |
| 2018/0144167 | A1* | 5/2018 | Guillama | G06Q 50/01 |

* cited by examiner

METHOD AND SYSTEM FOR ACCESS CONTROL WITH MODULATED LIGHTS

This application claims priority from European patent application serial no. 16176204.2 filed Jun. 24, 2016.

FIELD OF THE INVENTION

The present invention relates to a method for access control in an access control system for persons or vehicles comprising at least one access control device. The invention also relates to an access control system for persons or vehicles comprising at least one access control device, in particular to an access control system for implementing the method according to the invention.

BACKGROUND OF THE INVENTION

Methods and systems for access control for persons or vehicles are known from the prior art. In these cases, access control is normally carried out by means of the contactless reading of access authorizations, wherein access control devices are provided which have means for capturing and evaluating the access authorizations as well as locking elements, either mechanically or implemented by other means, which are automatically or manually moved from a locked position into an open position when a valid access authorization is presented.

SUMMARY OF THE INVENTION

The object of the present invention is to specify a method for access control in an access control system for persons or vehicles comprising at least one access control device, the implementation of which simplifies the access control. In addition, an access control system for persons or vehicles comprising at least one access control device, in particular an access control system for implementing the method according to the invention, will be specified.

This object is achieved by an access control system for persons or vehicles and a method as described below. Further configurations and advantages according to the invention are also discussed below.

Consequently, a method for access control in an access control system for persons or vehicles comprising at least one access control device is proposed, in which the at least one access control device, using selective modulation of the frequency or wavelength and/or spatial modulation and additionally by means of optional temporal modulation, of light emitted by a specified number of light sources, transmits information that can be received and demodulated by a mobile electronic device comprising a camera, for example by a smartphone. The information sent by an access control device includes a unique ID of the access control device which sent the information received by means of the modulation of the light sources, which information is used to control the access control device in accordance with data transmitted to the access control system by a mobile electronic device which receives the transmitted information.

The modulation of the light emissions of the light sources is carried out by means of a controller.

The light sources are preferably designed and/or arranged and/or screened, in such a way that the light emissions can be received in a defined area around the access control device, in which in the case of an access control device for persons under normal operating conditions only one person, and in the case of an access control mechanism for vehicles under normal operating conditions only one vehicle, can be located. This can be achieved, for example, via the intensity of the light, the emission angle of the light sources and suitable shielding. In this manner, the information sent by an access control device can only be received by mobile electronic devices that are located nearest to the access control device in the direction of access of the access control device and along an access lane assigned to the access control device, which in the case of an access control system with multi-lane access, an access control device is assigned to each access lane, is particularly advantageous.

The transmission of the information can take place on a continuous basis, at specified periodic intervals or after detection of a person or a vehicle, by means of a suitable sensor known from the prior art, wherein the light sources can be activated by a controller for the purpose of performing the modulation.

A modulation in the frequency range results in a change in the wavelength of the light emissions, wherein in the context of the invention, spatial modulation means activation and deactivation of individual light sources. In the context of the invention, temporal modulation also means a rapid switching of light sources on and off as a function of time, which is preferably undetectable by a human observer.

The information sent by the modulation can be received by a mobile electronic device comprising a camera, wherein the camera provides a single image, a sequence of single images at a defined time interval, or a video, which contains the information that was sent that is demodulated and evaluated using the appropriate software. For receiving, demodulating and evaluating the information, for example, an app installed on the mobile electronic device can be used. In this case, the app can automatically create a single image, a sequence of single images at a defined time interval or a video, depending on the light emissions.

An access control mechanism in the context of the invention may be assigned to an entrance or a driveway or an exit, wherein at the exit a check is performed as to whether the fee for staying in the coverage area of the access control system has been paid. The access control devices are connected to a server for the purpose of transferring data.

In accordance with the invention an access control system for persons or vehicles comprising at least one access control device is proposed, in which the side of the at least one access control device facing the incoming persons or vehicles comprises a plurality of light sources, such as LEDs, the light emissions of which in accordance with the method according to the invention are modulated with regard to their frequency and/or spatially and also optionally temporally, for the transmission of information.

In the case of an access control system for vehicles, in which according to the prior art the at least one access control device comprises a barrier arm, in accordance with one embodiment of the invention the side of the barrier arm facing the incoming vehicles comprises a plurality of LEDs, the light emissions of which can be modulated with regard to their frequency and/or spatially and also optionally temporally. According to a further extension of the invention, both sides of the barrier arm can comprise a plurality of LEDs, the light emissions of which can be modulated with regard to their frequency and/or spatially and also optionally temporally, wherein on the basis of the signals from a sensor, for example an induction loop, it is detected on which side of the barrier arm a vehicle is located, in order to activate the LEDs on this side. Alternatively or in addition, if present, a lane traffic light which indicates to the driver that their way is clear, a lighting strip on one side of a parking bollard facing the incoming vehicles, or any other available light source arrangement within a given radius of the access control device can also be used for implementing the method according to the invention, the light sources of which can be activated by means of a controller for the purpose of performing the modulation.

In the case of an access control system for persons, the at least one access control device can have a display facing towards the approaching persons, the background lighting of which is modulated in accordance with the invention; alternatively a side of the at least one access control device facing towards the approaching persons can comprise a plurality of LEDs, the light emissions of which can be modulated with regard to their frequency, and/or spatially and also optionally, temporally.

If a user wishes to drive into a car park house retract or an area covered by an access control system, when he is located in front of an access control device in the defined area in which the light emissions can be received, a mobile electronic device creates either a single image, a sequence of single images at a defined interval or a video of the light emissions from the light sources which contains the information that is sent. This information is then demodulated and evaluated using the appropriate software, for example by means of an app installed on the mobile electronic device.

In accordance with the invention, the information sent by the access control device contains a unique ID of the access control device which sent the information received by means of the modulation of the light sources. In accordance with one configuration of the invention, after the reception of the ID as described via the mobile electronic device over a suitable communication channel, for example by modulation of the flash of the mobile electronic device, the light emission of which can be received and demodulated by the access control device, via WLAN, Bluetooth low energy (BLE) or mobile radio communication and preferably using an app which is used for demodulating and evaluating the information transmitted, information containing the ID of the access control device and identification data of the user, but at least one unique ID of the user or the mobile electronic device, is transmitted to a server of the access control system.

If the light sources are designed and/or arranged and/or screened in such a way that the light emissions can be received in a defined area around the access control device in which under normal, operating conditions, in the case of an access control mechanism for persons only one person, and in the case of an access control mechanism for vehicles only one vehicle, can be located, then the information is transmitted to the access control device indicating at which access control device the user of the mobile electronic device, or the person carrying it, is located, for the case of an access control mechanism for persons in the access lane directly in front of the boundary between the area covered by the access control system and the area which is not covered by the access control system. In the case of an access control mechanism for vehicles, the information is sent to the access control system indicating at which access control device the user of the mobile electronic device, or the person carrying it, is located in a vehicle in the access lane directly in front of the boundary between the area covered by the access control system and the area which is not covered by the access control system.

In order to implement the communication channel the equipment best known to the person skilled in the art is provided; for example, for the case where the communication channel is based on the BLE standard, BLE-send/receive units are provided, which are connected to a server of the access control system for the purpose of transferring data.

After this interaction between the user and the access control system, a locking element of the access control device which sent the received information is activated in the opening direction if, on entering the area covered by the access control system the user is identified as a registered user, which is established on the basis of the user's ID or of the mobile electronic device, or if the user can be uniquely identified on the basis of his identification data, or when leaving the area covered by the access control system the necessary tees have been paid, which in the case of a registered user is effected by debiting his bank account or a credit card, and in the case of a non-registered user by cash or credit-card payment. In the case of a registered user, the payment of the fee is made automatically, wherein in the case of a non-registered user, when making the payment the ID of the user or of the mobile electronic device is read out or is transmitted via the app. On driving out, on the basis of the ID of the user or of the mobile electronic device, it is determined whether the fees have been paid, and if this is in fact the case, a locking element of the access control device is actuated in the opening direction.

In the context of an extension of the invention, the information sent by the access control device contains further information, in addition to the unique ID of the access control device, in particular location-related or event-related information. For example, the information sent by an access control device provided at an entrance driveway of an access control system for vehicles contains the number of free parking spaces, the location of free parking places, advertising about special offers in selected shops and/or current parking tariffs, etc. In the case of an access control system for fairs, ski resorts, leisure parks, exhibitions etc., information on such things as offers, plans etc. can also be transmitted.

It is also possible, to provide specially equipped information points in an area covered by an access control system, which comprise multiple light sources, the light emissions of which are modulated in accordance with the method according to the invention with regard to their frequency and/or temporally and/or spatially for the transmission of information, which transmit location-related or event-related information that can be received and demodulated by a mobile electronic device comprising a camera.

If, based on the transmitted ID of the mobile electronic device, a user is identified as a member of Technical Support, then immediately after the identification, using the modulation of the light sources described, status information on the access control device can be transmitted, so that before any inspection of an access control device initial information on its status exist.

The modulation of the light emissions of the light sources for the transfer of information can be provided in different ways. In accordance with the invention the information may be contained in the spatial distribution of the light sources, wherein at a given point in time specific light sources are active at specific locations. From this spatial distribution of the active light sources, the information can be extracted in a similar way to a barcode scan. To give users an impression of uniform continuous lighting of ail light sources, in a second time step which has the same period as the first, the light pattern containing the desired information and in which specific light sources are active at specified locations, can be displayed in exactly the inverted manner, wherein light sources active in the first step are deactivated and vice versa.

This measure does introduce a certain redundancy into the available modulation code space, so that only half of the combinations of activated and deactivated light sources can be used, but at high frequency a homogeneous brightness impression of all light sources is ensured for the user. This is particularly important for the illumination of a barrier arm in order to implement a homogeneous background illumination.

Alternatively or additionally, the modulation of the light emissions of the light sources for the transfer of information can be effected via the frequency or the wavelength of the emissions of the light sources. In this case each section in the frequency spectrum is assigned a unit of information. The precise gradation of the frequency ranges depends on the sensitivity of the receiver, the required robustness and the quantity of the information to be transmitted; the greater the quantity of information, the more finely adjusted the gradation is.

The frequency modulation can be combined with the spatial modulation. This can involve a simple combination, wherein spatially modulated light emissions are also color-coded, so that the displayable information is a multiple of the information displayable using the spatial modulation, wherein the multiplier is the number of possible color shades or spectral ranges of the frequency modulation. The displayable information can be further increased if each individual light source at each point in time can be assigned a frequency which is independent of the other light sources.

The quantity of the information that can be displayed at each instant with the method described above can be calculated as follows. Let n be the number of light sources and m be the number of distinguishable color shades. A purely spatial modulation enables the display of exactly two states per light source, namely ON or OFF. Thus, there are $$X_1=2^n$$

possible units of information that can be displayed. If in accordance with the frequency modulation a uniform color coding is specified for all light sources together, then for each of the above states m additional combinations are possible. Thus the total number of units of information increases to $X_2=m\cdot 2^n$.

If in accordance with the frequency modulation, the homogeneity of the light color of each individual light source is not required, then any single source of light can carry m+1 information units (one possible color shade or OFF). For n light sources, this results in $X_3=(m+1)^n$ possible units of information that can be displayed at any moment.

Additionally or alternatively a further, third degree of freedom can be introduced, namely the modulation of the light emissions of the light sources over time. In this case an analysis of the information transmitted takes place over several time slots. To enable this however, a single image is no longer sufficient; rather a definitely synchronized image sequence or a video sequence is necessary. In each time slot, an information unit independent of all previous time slots can therefore be displayed. Assuming k time slots in a given observation interval, the number of possible units of information transmissible is multiplied by exactly the same factor. Thus, depending on the method selected, this results in $X_3=X_1\cdot k=k\cdot 2^n$ (temporal and spatial modulation), $X_5=X_2\cdot k=k\cdot m\cdot 2^n$ (temporal and spatial modulation combined with frequency modulation with homogeneity in the light color of the individual light sources), and $X_6=X_3\cdot k=k\cdot(m+1)^n$ (temporal and spatial modulation combined with frequency modulation without homogeneity in the light color of the individual light sources) possibilities for the information units per observation interval, provided one assumes that there can be only one time slot per OFF state.

In the context of an advantageous extension of the invention, the frequency of the light emissions of the light sources lies exclusively in a frequency spectrum which is not visible to the human eye (e.g. infrared >800 nm or ultraviolet <400 nm), so that visible light patterns which might irritate the user can be avoided. In this case, the access control device according to the prior art can comprise additional light sources in a visible frequency spectrum, which function, for example, like a traffic light.

A further possibility for avoiding light patterns which could irritate the user is that the information to be transmitted selectively changes in different consecutive time slots of an observation period, wherein the possible displayable information per time slot depends on the information transmitted in the preceding time slots associated with the same observation period. In this case the ON-OFF ratio of the light sources must be identical over the entire observation period at the end of the observation period for all light sources, which ensures a homogeneous brightness or intensity of the displayed area. The exact number of OFF states is therefore arbitrary, but must be the same for all light sources. In addition, all the spectral ranges used for all light sources must be used exactly once in the observation period, so that averaged over the observation period, as long as the singular color change occurs sufficiently quickly for the human eye, a uniform mixed color is obtained. In this way, measured against the resolution of human perception, a uniformly illuminated surface in terms of color and intensity is ensured at all times.

For the purpose of abstraction and estimation of the displayable information units per observation interval, the OFF state can be treated as a special case of a spectral range (0 Hz), which in contrast to the remaining spectral, ranges can be used multiple times, since it does not contribute to the resulting color that is perceived by a human being. The number of OFF states need only be equal for all light sources in the observation period. If k time slots exist in the observation period and m spectral ranges are available, then $l=k-m$ OFF phases must be incorporated per observation period. Alternatively, integer multiples of the M spectral ranges can also be incorporated, because again, on average, the same color mixture is perceived over the human observation horizon. If there are e.g. k=9 time slots present in the observation period and m=4 spectral ranges available, then either m=4 time slots can be filled with color information and $l=k-m=5$ time slots with OFF states, or $2\cdot m=8$ time slots filled with color information and $l=k-2\cdot m=1$ time slot with an OFF state. The resulting overall color is identical in both cases and the illumination homogeneous in both cases, provided the same frequency is applied to all light sources. In the former case however, the area appears darker than in the second case. In a real implementation shorter observation periods will be selected, because the sequence of the spectral ranges over the time slots represents a difference in information, but the sequence of multiple off states does not. Only the absolute positions of the OFF states between the colored states are relevant. The OFF state can therefore be regarded as a wild card which does not affect the color, which in the best case should be used only once per observation period in order to allow an efficient implementation. An estimate of the possible displayable information units with this method can be performed as follows: In a first time slot the full number of combination possibilities evaluates to $T_1=(m+1)^n$; in the following interval the result is one less possibility per light source, because either one of the OFF states or one of the spectral ranges was used in the previous time slot. Thus there are now $T_3=(m+l-1)^n$ possible combinations. In the last time slot there will finally only be one possibility left, namely $T_k=(m+l-k+1)^n=1$.

The total quantity of transmissible information units per time slot is given by the product $$T_{ges}=\Pi_k T_k.$$

Taking into account the fact that the individual order of the OFF states is not relevant to the information content, the result must then be divided by $L=1!(1\times2\times3\times\ldots l)$.

A special case of the last mentioned method is that of light sources which are implemented as RGB LEDs. In this case m=3 spectral ranges are selected (red, green, blue), to mix any desired color. The light and dark phases of the individual colors that can be set in a pulse width modulation procedure, each of which is generated by a monochrome LED, define the resulting color mixture, wherein the dark phases are crucial to the brightness of the color mixture. In existing systems, neither the exact position of the phases of the pulse width modulation relative to each other nor the position of the dark phases in an observation period is relevant, since it is only the light-dark phases for each light source added over the observation period that must be suitably selected. If in these existing systems the pulse modulation phases are divided up into small time slots, which when added in turn produce the observation period, and the light-dark phases of the individual colors relative to each other are varied according to the previously specified procedure, then even with these systems it is possible to send information using the temporal position of the individual states (in this ease red-green-blue-OFF) to a light-sensitive sensor. This advantageously requires no design changes of any sort to be made, but only adjustments in the control software.

BRIEF DESCRIPTION OF THE DRAWINGS

An example of the invention will hereafter be explained in further detail based on the attached drawings. These show.

DETAILED DESCRIPTION OF THE PREFERRED EMBODIMENTS

Figure 1:
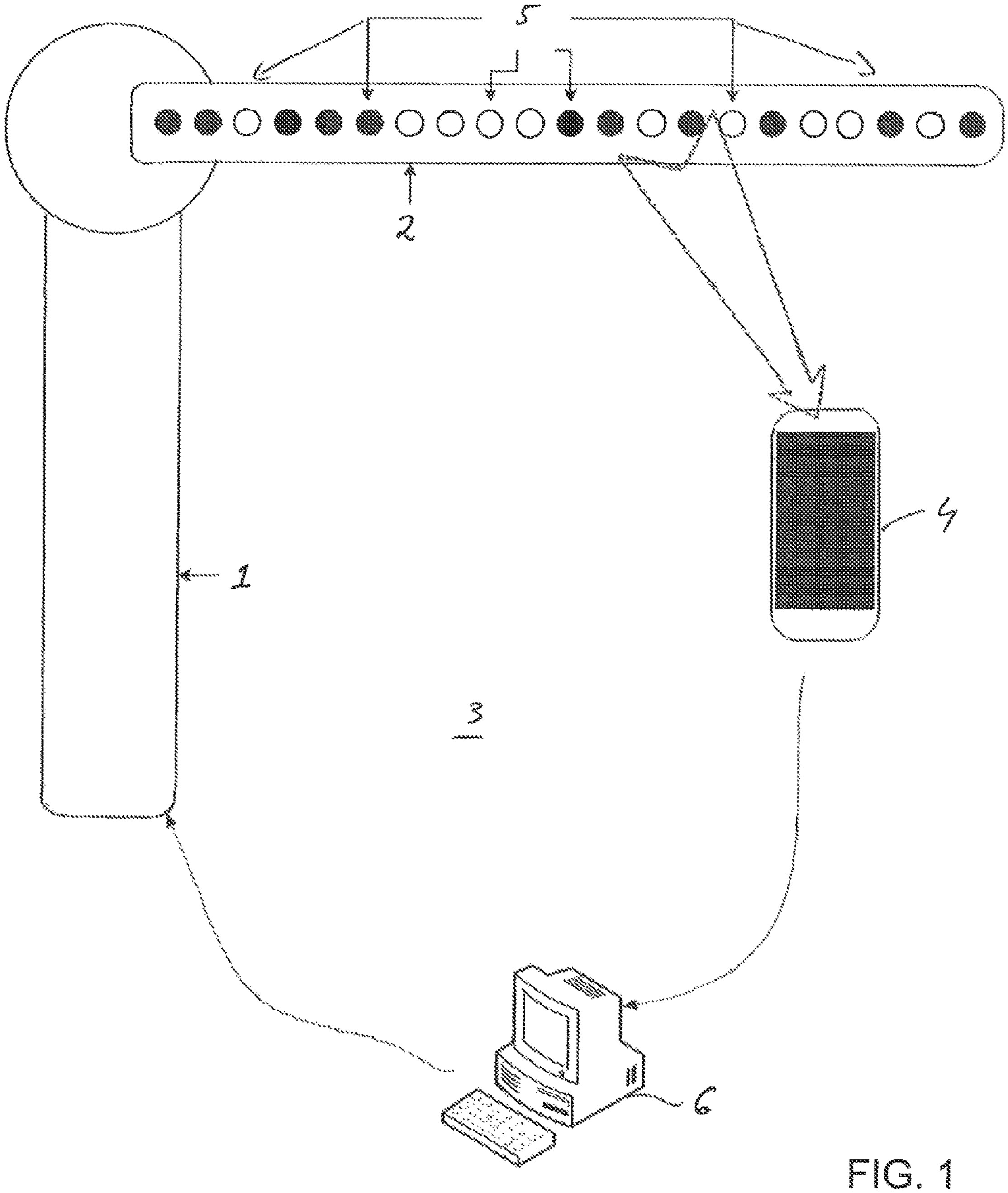
FIG. 1: a schematic view of an access control device of an access control system for vehicles, to illustrate the method according to the invention.

FIG. 1 shows an access control device for vehicles, comprising a parking bollard 1 and a barrier arm 2. In accordance with the invention, in the example shown the side of the barrier arm 2 facing incoming vehicles comprises a plurality of LEDs 5, the light emissions of which can be modulated with regard to their frequency, and/or spatially and also optionally, temporally, which enables the access control device to send information that can be received and demodulated by a mobile electronic device comprising a camera 4; the information sent by the access device contains a unique ID of the access control device, which is used to control the access control device in accordance with data transmitted by the mobile electronic device 4 to the access control system. In the FIG. the enabled LEDs are shown dark.

In this arrangement the camera of a mobile electronic device 4 creates a single image, a sequence of single images within a defined time interval or a video that contains the information that was sent, which is demodulated and analysed in the mobile electronic device 4 using the appropriate software.

In this case, the LEDs 5 are designed and/or arranged and/or screened in such a way that the light emissions can be received in a defined area around the access control device, in which under normal operating conditions only one vehicle can be located. If a mobile electronic device 4 located in a vehicle can receive the light emissions, the vehicle is located in the access lane 3 directly in front of the boundary between the area covered by the access control system and the area that is not covered by the access control system.

After the demodulation of the information and reception of the ID by the mobile electronic device 4, information containing the ID of the access control device and identification data of the user who is carrying the mobile electronic device 4 is sent, via a communication channel, to the access control system, comprising at least a unique ID of the user or of the mobile electronic device, wherein the barrier arm 2 of the access control device which sent the information received by the mobile electronic device 4 is activated in the opening direction, if on entering the area covered by the access control system the user is identified as a registered user on the basis of the user's ID or of the mobile electronic device, or if on the basis of the user's identification data he or she can be uniquely identified, or if on leaving the area covered by the access control system the necessary fees have been paid, which in the case of a registered user is effected by debiting his bank account or a credit card, and wherein in the case of a registered user the payment of the fee is made automatically and in the case of a non-registered user, when making the payment the ID of the user or of the mobile electronic device is read out or is transmitted to the access control system via the app. In FIG. 1, the numeral 6 designates a server of the access control system, to which the information sent by the mobile electronic device 4 over the communication channel is transmitted. The at least one access control device of the access control system is connected to the server 6 for data transfer and can be controlled thereby. In accordance with an extension of the invention, the information as to whether a single image, a sequence of single images within a defined time interval or a video should be created can be transmitted to the app over the communication channel between the mobile device and the electronic access control system.

Figure 2:
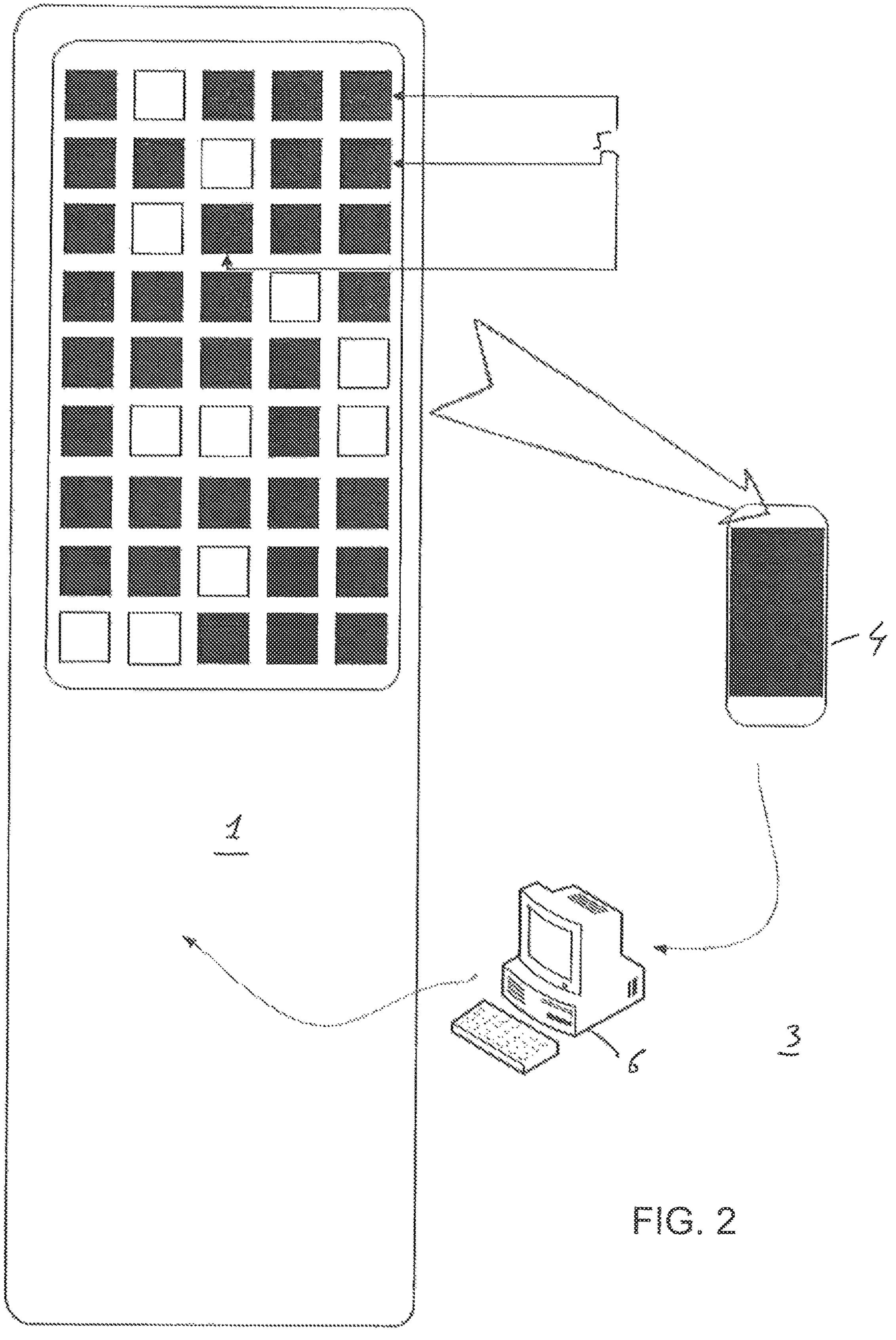
FIG. 2: a schematic view of an access control device of an access control system for vehicles designed in accordance with a further embodiment of the invention, to illustrate the method according to the invention.

As an alternative to providing the LEDs 5 on the barrier arm, the LEDs 5 can be provided on the side of a parting bollard 1 facing the incoming vehicles, as illustrated by FIG. 2, in which the barrier arm is not shown. In FIG. 2, in the same way as the example of FIG. 1, the enabled LEDs are shown dark.

The invention claimed is:

1. A method for access control in an access control system for persons or vehicles, having at least one access control device, the method comprising:

using the at least one access control device for at least one of a selective modulation of the frequency and a spatial modulation and a temporal modulation of light emitted by a specified number of light sources (5), to transmit information;

receiving and demodulating the information with a mobile electronic device (4) comprising a camera;

including in the information sent by the access control device, a unique ID of the access control device, which is used to control the access control device in accordance with data transmitted to the access control system by the mobile electronic device (4) which receives the transmitted information;

at least one of designing, arranging and screening the light sources (5) in such a way that the light emissions are receivable in a defined area around the access control device, in which, in a case of an access control mechanism for persons only one person, and in a case of an access control mechanism for vehicles only one vehicle, can be located;

after the reception of the ID by the mobile electronic device (4), sending the information containing the ID of the access control device and identification data of the user carrying the mobile electronic device (4), via a communication channel, to the access control system, the information comprising at least one unique ID of the user or of the mobile electronic device; and unlocking a locking element of the access control device which sent the information received by the mobile electronic device (4), either if on entering the area covered by the access control system, the user is identified as a registered user on the basis of either the user's ID or the mobile electronic device (4), or if based on the user's identification data the user is uniquely identified, or if on leaving the area covered by the access control system, necessary access fees have been paid, which in the case of the registered user is effected by debiting the user's bank account or credit card, and in the case of the registered user, payment of the fee is made automatically and in a case of a non-registered user, when making the payment the ID of the user or of the mobile electronic device (4) is read out or is transmitted to the access control system via an app.

2. The method for access control according to claim 1, further comprising the camera of the mobile electronic device (4) creates a single image, a sequence of single images with a defined time interval or a video which contains the information that was sent, which is demodulated and analyzed using suitable software.

3. The method for access control according to claim 1, further comprising the information sent by the access control device contains other information in addition to the unique ID of the access control device, the other information being either location-related information or event-related information.

4. The method for access control according to claim 3, further comprising, if based on the transmitted ID of the mobile electronic device (4), the user is identified as a member of Technical Support, then immediately after the identification, status information about the access control device can be transmitted, so that before any inspection of the access control device, initial information related to its status is available.

5. The method for access control according to claim 1, further comprising the frequency of the light emissions of the light sources (5) lies exclusively in a frequency spectrum which is not visible to a human eye.

6. The method for access control according to claim 1, further comprising the information to be transmitted selectively changes in different consecutive time slots of an observation period, the displayable information per time slot depends on the information transmitted in preceding time slots associated with the same observation period, an ON-OFF ratio of the light sources (5) is identical over the entire observation period at an end of the observation period for all light sources (5), which ensures a homogeneous brightness or intensity of the displayed area, the exact number of states is identical for all of the light sources (5), all spectral ranges used for all of the light sources (5) are used precisely once in the observation period, such that averaged over the observation period, as long as the change occurs sufficiently rapidly for the human eye, a uniform color mixture is obtained.

7. An access control system for persons or vehicles, the access control system comprising:

at least one access control device, a side of the at least one access control device facing incoming persons or vehicles comprises a plurality of light sources (5), light emissions of the light sources being modulated with regard to at least one of frequency, spatially and temporally, the modulation can be used to send information that is receivable and demodulatable by a mobile electronic device (4) comprising a camera, the light sources (5) being at least one of designed, arranged and screened in such a way that the light emissions being receivable in a defined area around the access control device, in which in a case of an access control mechanism for persons only one person, and in a case of an access control mechanism for vehicles only one vehicle, can be located, the information sent by the access control device contains a unique ID of the access control device, which is used to control the access control device in accordance with data transmitted to the access control system by the mobile electronic device (4) which receives the transmitted information, and in the case of an access control system for vehicles, the at least one access control device of which comprises a barrier arm (2), aside of the barrier arm (2) facing incoming vehicles comprises a plurality of LEDs, the light emissions of which can be modulated with regard to at least one of frequency, spatially and temporally.

8. An access control system for persons or vehicles, the access control system comprising:

at least one access control device;

a side of the at least one access control device facing incoming persons or vehicles comprises a plurality of light sources (5);

light emissions of the light sources being modulated with regard to at least one of frequency, spatially and temporally, and the modulation can be used to send information that is receivable and demodulatable by a mobile electronic device (4) comprising a camera;

the light sources (5) being at least one of designed, arranged and screened in such a way that the light emissions are receivable in a defined area around the access control device, in which in a case of an access control mechanism for persons only one person, and in a case of an access control mechanism for vehicles only one vehicle, can be located; and the information sent by the access control device containing a unique ID of the access control device, which is used to control the access control device in accordance with data transmitted to the access control system by the mobile electronic device (4) which receives the transmitted information;

wherein in a case of an access control system for persons, the at least one access control device has a display, a background lighting of the display is modulated with regard to its frequency, spatially and temporally, or in a case of an access control system for persons a side of the at least one access control device facing towards the approaching persons comprises a plurality of LEDs, the light emissions of which is modulated with regard to frequency, spatially and temporally.

* * * * *